United States Patent [19]

Kanai et al.

[11] Patent Number: 5,634,534

[45] Date of Patent: Jun. 3, 1997

[54] LONGITUDINAL LOCKING MECHANISM FOR VEHICLE SEAT

[75] Inventors: Shigeru Kanai; Hitoshi Otsuka, both of Akishima, Japan

[73] Assignee: Tachi-S Co., Ltd., Tokyo, Japan

[21] Appl. No.: 629,628

[22] Filed: Apr. 9, 1996

[51] Int. Cl.[6] .................................................. B65H 59/10
[52] U.S. Cl. ........................................ 188/67; 188/265
[58] Field of Search ............................. 188/67, 265, 371, 188/372, 374; 74/89.15, 89.16, 424.8 R, 424.8 A; 297/374, 375

[56] References Cited

U.S. PATENT DOCUMENTS

| | | |
|---|---|---|
| 4,425,987 | 1/1984 | Porter ........................ 188/67 |
| 4,592,591 | 6/1986 | Wiers . |
| 4,685,734 | 8/1987 | Brandoli . |
| 4,770,465 | 9/1988 | Wiers . |
| 4,856,762 | 8/1989 | Selzer . |
| 4,880,084 | 11/1989 | Tanaka et al. . |
| 5,136,889 | 8/1992 | Hill et al. . |
| 5,360,256 | 11/1994 | Miller et al. . |
| 5,454,622 | 10/1995 | Demopoulos . |

FOREIGN PATENT DOCUMENTS

| | | |
|---|---|---|
| 53-114120 | 10/1978 | Japan . |
| 54-8322 | 10/1979 | Japan . |

Primary Examiner—Douglas C. Butler

[57] ABSTRACT

A longitudinal locking mechanism in which a male lock member may be adjustably projected from a female lock member in the longitudinal direction thereof. The female lock member has a bellmouthed split end portion warped outwardly and radially relative to the central axis thereof. Such bellmouthed split end portion may be elastically closed by a slide ring for threaded engagement with the male lock member, so that a desired projection amount of the male lock member may be adjusted for locking purposes in a vehicle seat. The slide ring is biased in a direction to close the bellmouthed split end portion of female lock member, and may be drawn by an operation lever, via an actuation element, in a direction away from that bellmouthed split end portion so as to release the threaded enagement between the male and female lock members.

16 Claims, 4 Drawing Sheets

LONGITUDINAL LOCKING MECHANISM FOR VEHICLE SEAT

BACKGROUND OF INVENTION

1. Field of the Invention

The present invention relates to a longitudinal locking mechanism for use in a vehicle seat. The longitudinal locking mechanism has a rod slidably inserted in a cylindrical body along the longitudinal direction thereof such as to permit the rod to be adjustably locked in a selected length for adjustment of a movable element in the vehicle seat.

2. Description of Prior Art

As widely known in a seat for vehicles, a longitudinal locking mechanism is employed as one of mechanical lock devices to lock and unlock a movable element in the seat such as a reclining device or seat height adjuster. Hitherto, most of such longitudinal locking mechanism has been of the construction wherein a rod is slidably accommodated in a cylindrical body in the longitudinal direction thereof, with a torsion spring being wound around the rod. According to this conventional locking mechanism, the rod is throttled strongly by the torsion spring and retained in a locked state due to a friction therebetween, thereby projecting its free end portion in a selected length from the cylindrical body. The rod may be released from the locked state by forcibly reducing the throttling force of torsion spring and permitted to be projected from and withdrawn into the cylindrical body as desired. In that way, the free end portion of the rod may be adjusted in length for applications to adjustments of movable elements in the seat.

The locking strength in this conventional torsion spring locking mechanism is dependent only upon a frictional force between the rod and torsion spring. It has been found that errors in diameter between the torsion spring and rod, or variation of spring force in each torsion spring, which are apt to occur during assemblage, will inevitably result in undesired variations of frictional force between the rod and torsion spring in each of the locking mechanisms and therefore there will be no constant quality and no reliability of locking performances in this sort of conventional longitudinal locking mechanism. In other words, assembling such torsion-spring longitudinal locking mechanism requires a high precision in maintaining a constant quality of the torsion spring and rod in terms of their relative dimensions and requires a high expertise in assembling them together, with the result that a more intricate design of structure or troublesome labor is inevitably demanded on the part of workers, which incurs much costs involved. Moreover, normally, the unlocking operation in this mechanism requires a cocentric rotary action about the torsion spring to reduce the throttling force of the same spring to the rod, and such rotary action is made in a directin transversing the width-wise direction of seat, giving uneasy and hard fealing to a user as compared with a longitudinal drawing or pressing action.

SUMMARY OF THE INVENTION

In view of the above-stated drawbacks, it is a primary purpose of the present invention to provide an improved longitudinal locking mechanism which permits for easy and positive locking operation in a vehicle seat with a simplified structure.

In order to achieve such purpose, the longitudinal locking mechanism, in accordance with the present invention, basically comprises:

a tubular base member;

a male lock means having an external threaded portion, which male lock means is so slidably accommodated in the tubular base member as to project therefrom and withdraw thereinto in a longitudinal direction thereof;

a female lock means connected to the tubular base member, the female lock means having a bellmouthed split end portion in which a plurality of split sections are so defined as to be elastically warped outwardly and radially relative to a central axis of the female lock means, wherein inwardly threaded regions are defined in those plurality of split sections, respectively;

a slide means which is so slidably attached about the female lock means as to be movable along a longitudinal direction thereof for warping the plural split sections of female lock means in a direction towards and away from a central axis of the female lock means;

an operation lever; and an actuation means operatively connected to the slide means and operation lever, which actuation means is operable via the operation lever to cause the slide means to be slid along the female lock means in the longitudinal direction thereof so as to forcibly warp the plural split sections of female lock means inwardly towards the central axis of same female lock means to thereby bring the internally threaded regions of split sections to a meshed engagement with a part of the externally threaded portion of male lock means.

Accordingly, the female lock means provides an embracingly meshed engagement with and about the male lock means, which insures to lock the male lock means at a selected point relative to the female lock means, in a simplified structure, thereby enabling a user to smoothly adjust the amount of projection of male lock means, with an unchanged locking quality.

The male lock means is so biased by a biasing said actuation means includes a spring for so biasing the slide means as to forcibly warp the plural split sections of female lock means inwardly towards the central axis of female lock means.

Preferably, the female lock means may comprise a generally horn shape which is formed from a tubular metallic material such that the bellmouthed split end portion thereof is given a certain elastic property.

As an essential mode in the present invention, the actuation means comprises a compression spring interposed between the slide means and tubular base member, the compression spring biasing the slide means such as to forcibly warp the split sections of female lock means inwardly towards the central axis of said female lock means and a drawing means for drawing the slide means against a biasing force of the compression spring in a direction away from the slide means, the drawing means being connected to the slide means and operation lever.

Accordingly, the drawing means permits the operation lever to be moved in a longitudinal direction, which avoids such concentric rotary action found in the prior art. Preferably, the foregoing drawing means may comprise a guide frame rotatably provided at said tubular base member, with such an arrangement that the guide frame may be rotated relative to the tubular base member by the operation lever in a direction to draw the slide means away from the split sections of female lock means, against the biasing force of compression spring.

Preferably, the foregoing guide frame may be formed in a manner surrounding both female lock means and tubular lock member and having a center of rotation above the tubular lock member, and further be formed with a pair of holes in the respective two lateral sides thereof such as to be disposed symmetrically to and on the opposite sides of both female lock means and tubular base member. The slide means may be provided with a pair of spaced-apart engagement pins projecting in a direction opposite to each other, and those two engagement pins are fitted in the two holes of guide frame, respectively.

As one exemplary mode, the guide frame may be of a generally rectangular shape, and an upper side of such guide frame be connected rotatably to a part of a bracket fixed on the upper side of the tubular base member, wherein such part of bracket corresponds to the foregoing center of rotation. Further, th foregoing two holes be formed in the respective two lateral sides of guide frame, and the operation lever be fixed to one of the two lateral sides of guide frame.

As another alternative exemplary mode, the guide frame may be provided separately from the tubular base member, having a center of rotation defined therein, and the drawing means may further include a pair of cable wires disposed symmetrically relative to and alongside both female lock means and tubular base member, with such an arrangement that first end portions respectively of the two cable wires are fixed to two lateral sides of the slide means and slidably supported on said tubular member, while second end portions respectively of the two cable wires are both connected to the guide frame.

Other features and advantages of the present invention will become apparent from reading of the description hereinafter with reference to the annexed drawings.

DETAILED DESCRIPTION OF PREFERRED EMBODIMENTS OF THE INVENTION

Now, FIGS. 1 through 8 illustrate preferred constructions of longitudinal locking mechanisms by way of example in accordance with the present invention.

All through the embodiments in FIGS. 1 to 8, a basic construction of longitudinal locking mechanism commonly contemplated in the present invention is comprised of:

(a) a tubular base member (12 or 12');

(b) a tubular female lock means (A) having a bellmouthed split end portion (22a) in which an internally threaded region (26) is formed;

(c) a columnar male lock means (B) slidably inserted in the tubular female lock means (A), which has an externally threaded region (26) formed partway and circumferentially thereof and a biasing spring (16) provided for biasing the male lock means in a direction to project from the female lock means (A);

(d) a slide ring means (C) slidably attached about the tubular female lock means (A) for closing and opening the bellmouthed split end portion (22a); and (e) an actuator means (D) arranged between the slide ring means (C) and an operation lever (36).

Figure 1:
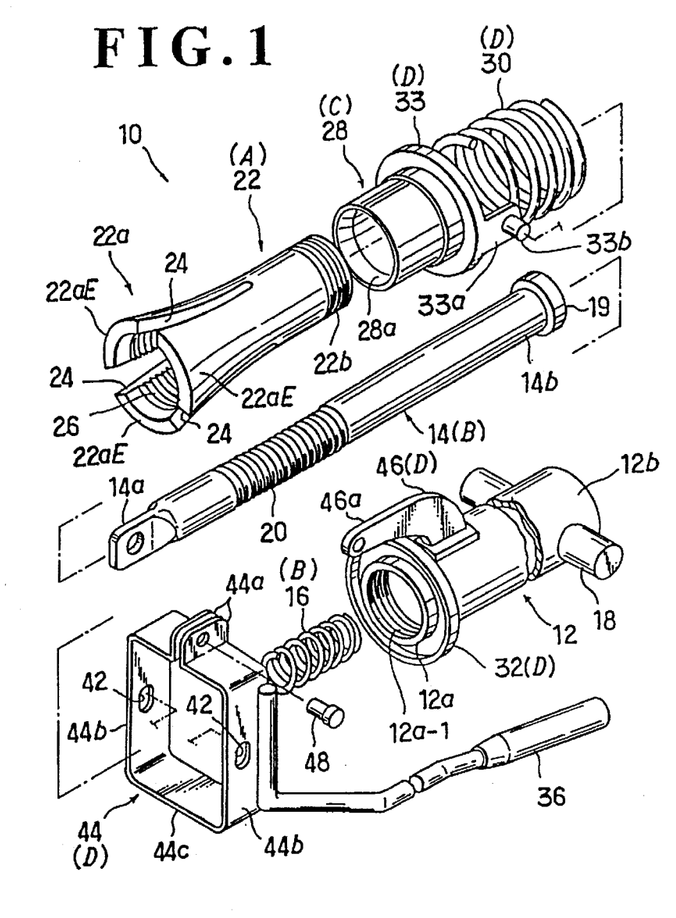
FIG. 1 is an exploded schematic perspective view of a first mode of longitudinal locking mechanism in accordance with the present invention.
Figure 2:
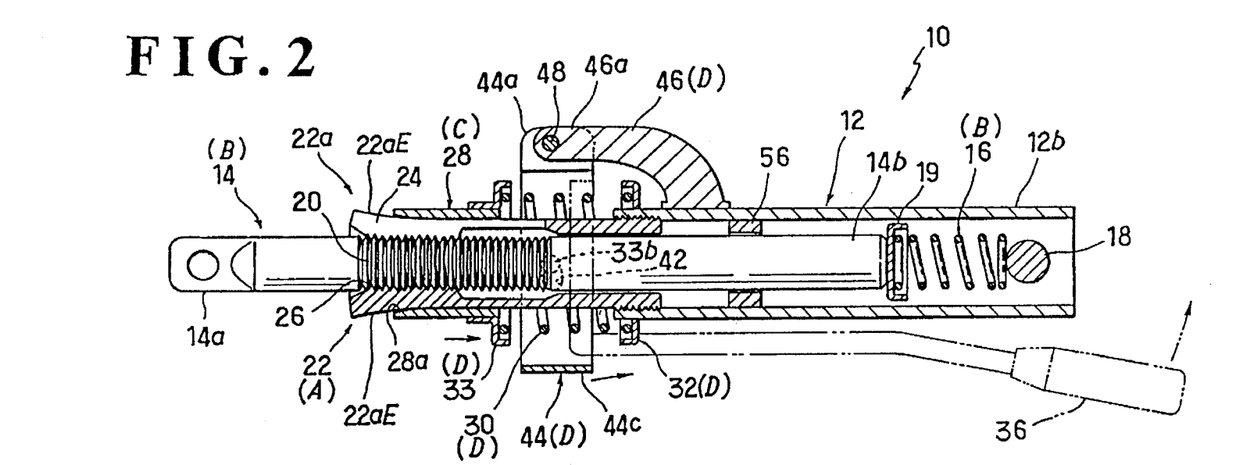
FIG. 2 is a schematic longitudinally sectional view of such first mode of the present invention as in FIG. 1.
Figure 3:
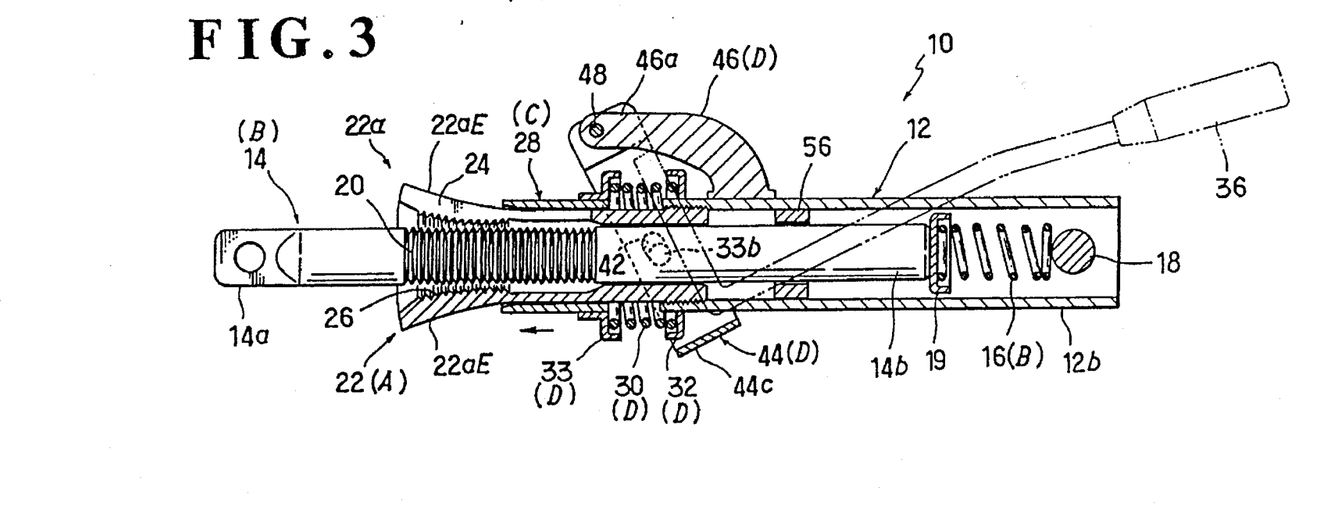
FIG. 3 is a schematic longitudinally sectional view of the same first mode, showing an unlocked state thereof.
Figures 4, 6:
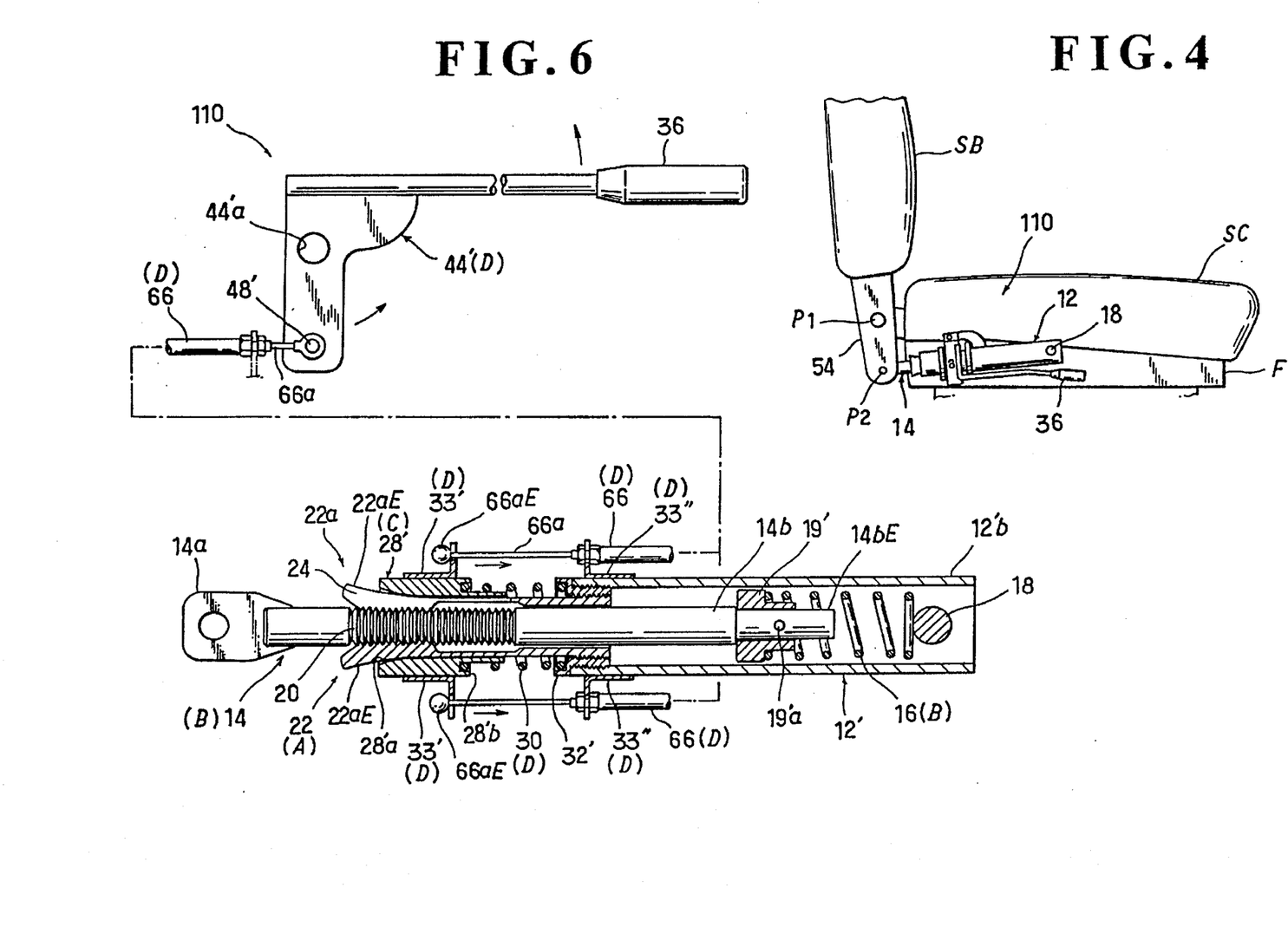
FIG. 4 is a partly broken front view showing the first mode of the invention to be used in a reclining device of a vehicle seat.
FIG. 6 is a schematic fragmentary longitudinal section of such second mode of the invention as in FIG. 5.
Figure 5:
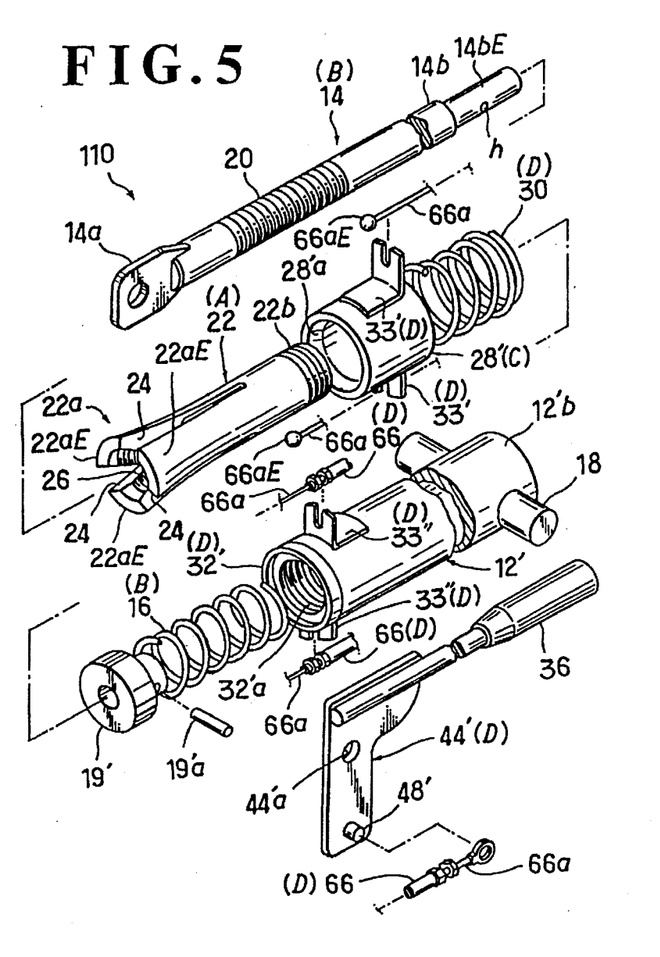
FIG. 5 is an exploded schematic perspective view of a second alternative mode of longitudinal locking mechanism in accordance with the invention.
Figure 7:
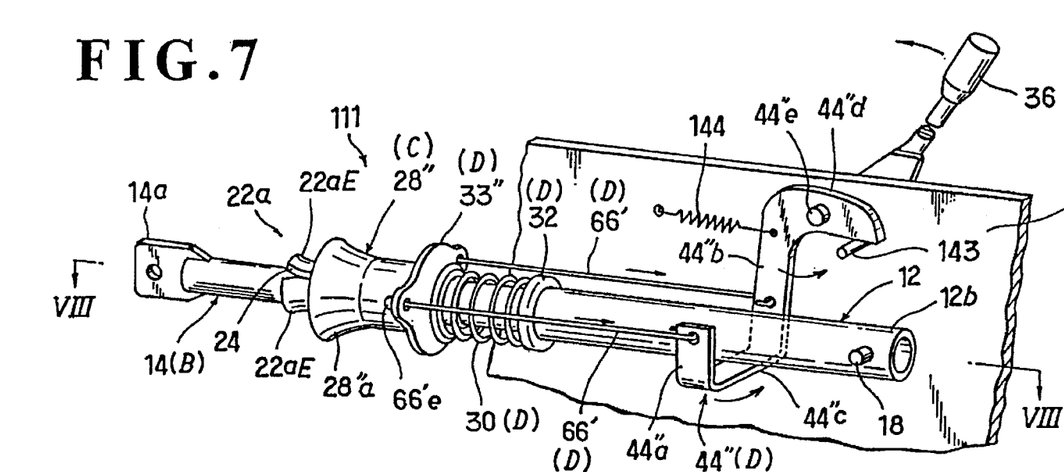
FIG. 7 is partly broken schematic perspective view of a third alternative mode of longitudinal locking mechanism in accordance with the invention.
Figure 8:
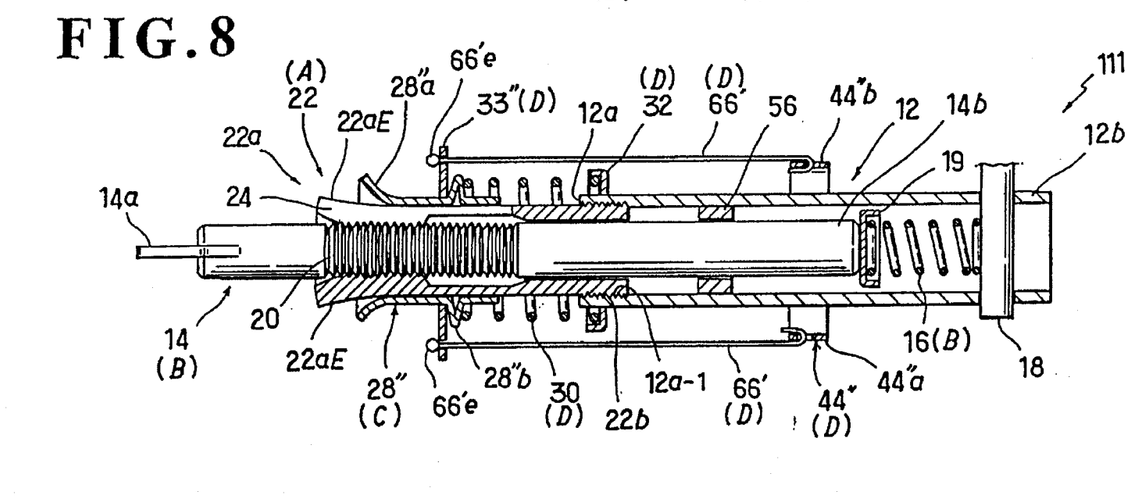
FIG. 8 is a partly broken sectional view taken along the line VIII—VIII in FIG. 7.

This basic structure in accordance with the present invention is embodied commonly in one mode shown in FIGS. 1 to 3, in another alternative mode shown in FIGS. 5 and 6 and in still another alternative mode shown in FIGS. 7 and 8, with some modifications and additions permissible within the gist of the present invention. Of course, those modes are not limitative, and other further alternative modes may be adopted in various ways within the gist of the present invention.

Firstly, reference is made to the first mode of longitudinal locking mechanism (10) shown in FIGS. 1 to 3. In the present mode, as the foregoing female and male lock means (A) (B), there are provided a tubular female lock member (22) having three-split bellmouthed free end portion (22a) and a columnar male lock rod member (14) having an externally threaded portion (20) formed in the forward half portion thereof.

The female lock member (22) is formed from a metallic tubular material in the illustrated generally horn shape, as by quench hardening, such that the forward bellmouthed end portion (22a) thereof is so cut in the longitudinal direction as to form three equidistant elongated splits (24) therein, thus providing three divergent split sections (22aE) warped outwardly and radially relative to a central axis of the straight tubular section thereof. Each of the three divergent split sections (22aE) has an internally threaded region (26) formed in the inner surface thereof. The female lock member (22) is further formed with an externally threaded region (22b) at the backward end thereof. A tubular base member (12) is formed with an internally threaded portion (12a–1) in the forward end thereof. Thus, the female lock member (22) is connected to the tubular base member (12) by threadedly engaging the externally threaded portion (22b) of the former (22) with the internally threaded portion (12a–1) of the latter (12).

As the slide ring means (C), a slide ring (28) is provided, which has a divergently sloped internal annular region (28a) formed in the forward end thereof. This slide ring (28) is slidably fitted on and about the straight tubular section of the female lock member (22), such that the internal annular region (28a) of slide ring (28) is to be fit contacted with a divergent root area of the bellmouthed end portion (22a) of female lock member (22) for the purpose of causing the three divergent split sections (22aE) to move toward one another from the radially warped state, as will be explained later.

The male lock rod member (14) is slidably accommodated in both female lock and base members (22) (12) which are connected together as stated above in the manner shown in FIG. 2, with its backward end (14b) being abutted via a flange (19) against a biasing spring (16) sandwiched between the flange (19) and a support rod (18). Hence, the male lock rod member (14) is biased by the spring (16) in a direction forwardly of both female and base members (22) (12) so as to project both forward end (14a) and externally threaded portion (20) thereof from the bellmouthed end portion (22a). Designation (56) denotes a support ring member which is fixed on the inner surface of tubular base member (12), through which support ring (56), the male lock rod member (14) is slidably supported. With the structure thus described, a basic unit of male and female lock mechanism (12, 14, 16, 22, 28) is established.

On the other hand, the actuation means (D) in this mode (10) is embodied by comprising: a pair of spaced-apart first and second ringed flanges (33) (32); a compression spring (30); a guide frame (44); and a support bracket (46).

Turning to view of FIG. 2, the first ringed flange (33) is fixed on and about the outer surface of the slide ring (28), while the second ringed flange (32) is fixed on and about the forward end part (12a) of tubular base member (12), such that the two flanges (33) (32) face toward each other for retaining the compression spring (30) therebetween. As understandable from FIGS. 1 and 2, the first ringed flange (33) is formed with a pair of lugs (33a) on which two engagement pins (33b) are formed, respectively, and thus it is to be understood, though not shown clearly, that a pair of engagement pins (33b) are arranged on the opposite sides of the slide ring (28), projecting outwardly and symmetrically relative thereto.

The guide frame (44) is shown in FIG. 1 to be formed in a rectangular shape having a lower frame section (44c), two lateral frame sections (44b) (44b) and two upper connecting lugs (44a). A pair of connecting holes (42) (42) are formed midway in the respective two lateral frame sections (44b) (44b) in a mutually faced relationship. The operation lever (36) is fixed to one of the two lateral frame sections (44b). As shown in FIG. 1, the guide frame (44) is mounted on the above-described unit of male and female lock mechanism (12, 14, 16, 24, 28) such that the two engagement pins (33b) of first ringed flange (33) are slidably engaged in the two connecting holes (42) (42) of guide frame (44), respectively, and that the two connecting lugs (44a) of guide frame (44) are rotatably connected via a pin (48) to one end (46a) of support bracket (46) fixed on the tubular base member (12).

As constructed above, therefore, when in no use, the slide ring (28) is biased by the compression spring (30) forwardly along the longitudinal direction of the female lock member (22), so that the divergently sloped internal annular region (28a) of slide ring (28) is normally biased to a close contact with the divergent root area of bellmouthed split end portion (22a) of female lock member (22), whereupon, all the three divergent split sections (22aE) are biased toward one another, thereby forcibly bringing their respective internally threaded region (26) in a full meshed engagement with a part of the externally threaded portion (20) of male lock rod member (14). Namely, the male lock rod member (14) is placed in a locked state and projects in a given length, with respect to the female lock member (22). At the same time, under the forward biasing force of the compression spring (30), the guide frame (44) and operation lever (36) are normally biased to the upright and horizontal non-use positions, respectively, as indicated by the two-dot chain lines in FIG. 2.

Conversely, referring to FIG. 3, when it is desired to adjust the projection amount of male lock rod member (14) from the female lock member (22), the operation lever (36) may be raised, overcoming the biasing force of spring (30), relative to the pin (48) at the support bracket (46), which will cause simultaneous rotation of the guide frame (44) about the same pin (48) in the upward direction. With such rotation of guide frame (44), the two guide holes (42) are displaced in the backward direction relative to the female lock member (22), i.e. in a direction opposite to the forward biasing direction of the compression spring (30), and therefore, both two engagement pins (33b) engaged in the respective those two guide holes (42) are also displaced together with the guide frame (44), causing simultaneous backward sliding motion of the slide ring (28) along the female lock member (22) away from the bellmouthed end portion (22a). As a result, the three divergent split sections (28aE) are opened to the radially warped initial position as shown in FIG. 3, due to their elastic recovery nature, whereby the externally threaded portion (20) of male lock rod member (14) is released from the meshed engagement with the internally threaded regions (26) of those three split sections (22aE). At this moment, the male lock rod member (14) is allowed to be projected forwardly from the male lock member (24) by the biasing force of spring (16). Then, a user should lower the operation lever (36) to cause the slide ring (28), via those associated actuation elements (44, 33b, 33, 30), to slide forwardly along the female lock member (22) to close the three split sections (22aE), thereby effecting a meshed engagement of the internally threaded region (26) with a selected part of the externally threaded portion (20) so as to set a desired projection amount of the male lock rod member (14). Accordingly, for example, in the case where the present lock mechanism (10) is used in a reclining device of vehicle seat as shown in FIG. 4, a seat back (SB) may be adjusted in reclining angle relative to a seat cushion (SC) by adjusting the projection amount of male lock rod member (14). In this case, the lock mechanism (10) is fixed at its support rod (18) to a seat cushion frame (F), and pivotally connected at its forward end part (14a) to the lower end of upper arm (54) via a pin (P2). Thus, the projection and withdrawal of the male lock rod member (14) produces the fore-and-aft inclination of the seat back (SB) about a pin (P1) fixed to frame (15) of seat cushion (SC).

FIGS. 5 and 6 show a second mode of longitudinal locking mechanism (110). This mode is basically identical in structure and mechanical principle to the foregoing first mode (10) in terms of the male and female lock means (A) (B), tubular base member (12) and slide ring means (C), except that some modifications are made to the actuation means (D). Hence, specific explanations are deleted with regard to those basically identical four means (A) (B) (C) (12 or 12') to those of the first mode (10) for the sake of simplicity in description.

Namely, as understandable from FIG. 6, an actuation means (D) according to the present mode (110) differs from that of the first mode (10) in that:

(i) A pair of first and second ringed flanges (28'b) (32') are provided as an equivalent to those (33) (32) of the first mode (10). They are provided at the backward end of slide ring (C or 28') and the forward end of tubular base member (12'), respectively, with the compression spring (30) retained between the two flanges (28'b) (32'), as likewise in the first mode (10).

(ii) A pair of first and second L-shaped brackets (33') (33") and a pair of cable wires (66) (66) are arranged around the compression spring (30), while a guide frame (44') is connected to both bifurcated cable wires (66) (66), as one of the actuation means (D) equivalent in functions to the support bracket (46) and guide frame (44) of the first mode (10).

The above-noted actuation means (D) in this particular mode (110) are therefore an alternative to the previously described actuation means (D) of the first mode (10) for the common purpose of causing the bellmouthed split end portion (22a) of female lock member (22) to be opened and closed with respect to the male lock member (14).

Specifically, according to the illustrations in FIGS. 5 and 6, the first ringed flange (28'b) is formed in a recessed manner in and along the backward end of slide ring (28'), and the second ringed flange (32') is threadedly secured in the forward end of the tubular base member (12). Strictly stated, the slide ring (28') is of a great thickness relative to that of the slide ring (28) of the first mode (10), but basically identical in shape and structure thereto. Both first and second ringed flanges (28'b) (32') have an inner diameter slightly greater than the outer diameter of compression spring (30) for the purpose of receiving and retaining the compression spring (30) therebetween. The two first L-shaped brackets (33') (33') are fixed on the respective upper and lower sides of slide ring (28'), and likewise, the two second L-shaped brackets (33") (33") are fixed on the respective upper and lower sides of tubular base member (12'), such that the first and second L-shaped brackets (33') (33") face toward one another as best seen in FIG. 6. The spherical securing ends (66aE) respectively of the bifurcated cable wires (66) (66) are each secured in the notches of first and second L-shaped brackets (33') (33'), respectively, whereas on the other hand, the bifurcated cable bodies (66) (66) are secured in the notches of first and second L-shaped brackets (33') (33").

The bifurcated two cable wires (66) (66) are connected in a unitary one cable manner to the lower end of the guide frame (44'); namely, the ringed end of wire (66a) of such unitary one cable body is securely fitted to a pin (48') fixed on the lower end of guide frame (44'). As shown, the operation lever (36) is fixed on the upper end of guide frame (44'). A rotation hole (44'a) is formed midway in the guide frame (44'). Although not shown, the guide frame (44') is rotatably supported, at the hole (44'a) thereof, on a support shaft fixed on the frame (F), as can be seen in FIG. 4, for example.

The backward end (14b) of male lock member (14) is formed with an extension (14bE) having a small diameter relative thereto. As shown, a ringed flange (19') equivalent to that (19) of the first mode (10) is fitted about that extension (14bE) and fixed thereto by means of a stopper pin (19'a) penetrating through both hole (h) of the extension (14bE) and ringed flange (19').

According to the present second mode (110), when in no use, the slide ring (28') is biased by the compression spring (30) forwardly along the longitudinal direction of female lock member (22), thereby biasing the divergently sloped internal annular region (28'a) thereof to a close contact with the divergent root area of bellmouthed end portion (22a) of female lock member (22), so as to force all the three split sections (22aE) towards one another, whereby the internally threaded regions (26) of three split sections (22aE) are kept in a full meshed engagement with a part of the externally threaded portion (20) of male lock rod member (14). Also, under the biasing force of compression spring (30), both two cable wires (66a) (66a) are drawn forwardly with slide ring (28') between the first and second L-shaped brackets (33') (33"), which in turn draws the lower end of guide frame (44') in a direction to bias the operation lever (36) towards the horizontal non-use position as shown in FIG. 6.

Conversely, when it is desired to adjust the projection amount of male lock rod member (14) from the female lock member (22), the operation lever (36) may be raised, overcoming the biasing force of spring (30), relative to the hole (44'a) of guide frame (44'), which will cause simultaneous rotation of the lower end of guide frame (44') about the same hole (44'a), as indicated by the arrows in FIG. 6. With such rotation of guide frame (44'), the bifurcated cable wires (66a) (66a) are drawn backwardly relative to the female lock member (22), i.e. in a direction opposite to the forward biasing direction of the compression spring (30), imparting thus a backward pulling force to both paired first brackets (33'), whereby the slide ring (28') integral with those brackets (33') is caused to slide along the female lock member (22) away from the bellmouthed end portion (22a). As a result, the three divergent split sections (28aE) are opened radially from the axis of male lock rod member (14), as seen in FIG. 3, due to their elastic recovery nature, so that the externally toothed portion (20) of male lock rod member (14) is released from the meshed engagement with the internally threaded regions (26) of those three split sections (28aE). At this moment, the male lock rod member (14) is allowed to be projected forwardly from the male lock member (24) by the biasing force of spring (16). Then, a user can lower the operation lever (36) so as to to effect meshed enagement between the male and female lock members (14) (22) and set a desired projection amount of the male lock rod member (14). It is appreciated in this second mode (110) that the symmetrical disposition of the paired cable wires (66) (66) relative to the slide ring (28') gives a uniform rectilinear drawing force to both slide ring (28') and compression spring (30) and that the operation lever (36) may be disposed anywhere separate from the locking mechanism for remote control operation.

FIGS. 7 and 8 show a third alternative mode (111) which is a slight modification of the foregoing second mode (110) on the basis of the first mode (10).

Namely, the present third mode of longitudinal locking mechanism (111) is basically identical in the male and female lock means (A) (B), slide ring means (C) and base member (12) to both first and second mode (110), except that a guide frame (44") is disposed coaxially of the body of locking mechanism, with the operation lever (36) connected directly to the guide frame (44"), as similar to the first mode (10), instead of the separate arrangement of the guide frame (44') and operation lever (36) from the locking mechanism suggested in the second mode (110). Hence, specific explanations are deleted with regard to those basically identical four means (A) (B) (C) (12 or 12') to those of the first and second modes (10) (110) for the sake of simplicity in description.

According to the present mode (111), an actuation means (D) differs from the second mode (110) in that:

(i) A ringed bracket (33") is secured about the slide ring (28"), as an equivalent to the paired first L-shaped brackets (33') of the second mode (110).

(ii) A generally U-shaped guide frame (44") is provided as an equivalent to a flat plate of guide frame (44') of the second mode (110).

(iii) A pair of separate wires (66') (66') are extended between the ringed bracket (33") and U-shaped guide frame (44") as an equivalent to the bifurcated cable wire (66) of the second mode (110).

The above-noted actuation means (D) in this particular mode (111) are therefore an alternative to the previously described actuation means (D) of the second mode (110) for the common purpose of causing the bellmouthed split end portion (22a) of female lock member (22) to be opened and closed with respect to the male lock member (14). Specifically, according to the illustrations in FIGS. 7 and 8, the ringed flange (33") is secured about a slide ring (28") and retained by the protruded annular detent portion (28"b) of the same slide ring (28"). The forward end part (28"a) of slide ring (28") is formed in a bellmouthed fashion, as an equivalent to the divergently sloped internal annular regions (28a) (28'a) respectively of the two slide rings (28) (28') of first and second modes (10) (110), so as to fit contact the divergent root area of the bellmouthed end portion (22a) of female lock member (22).

The generally U-shaped guide frame (44") is formed by a horizontal frame section (44"c) and a pair of first and second vertically extending lateral frame sections (44"a) (44"b), such that the second lateral frame section (44"b) extends upwardly longer than the first lateral frame section (44"a) and terminates in a hook end portion (44"d) extending backwardly of the tubular base member (12). The hook end portion (44"d) is connected via a hinge pin (44"e) to the operation lever (36), the hinge pin (44"e) penetrating rotatably through the frame (F) as in FIG. 4. As shown, the two spherical securing ends (66'e) of two separate wires (66') (66') are secured in the ringed flange (33"), while another ends of the same (66') (66') are secured in the two vertical extending lateral sections (44"a) (44"b), respectively. The tubular base member (12) is fixed via the shaft (18) to the frame (F). Designation (143) denotes a stopper pin on which the hook end portion (44"d) of guide frame (44") is abutted. This stopper pin (143) limits the clockwise rotation of the guide frame (44"), as viewed from FIG. 7, which is caused by the forward pulling force of the two wires (66') (66') produced from the forward biasing force of compression spring (30).

Designation (144) denotes an auxiliary spring extended between the frame (F) and guide frame (44"). By means of this auxiliary spring (144), the guide frame (44") is given an additional biasing force in the clockwise direction relative to the hinge pin (44"e) and positively abutted against the pin (143) in the illustrated upright non-use state.

In brief, when it is desired to adjust the projection amount of the male lock rod member (14) relative to the female lock member (22), a user should rotate upwards the operation lever (36) as indicated by the arrows in FIG. 7, which will cause simultaneous anticlockwise rotation of the guide frame (44") about the hinge pin (44"e) so that both lateral sections (44"a) (44"b) of guide frame (44") are displaced in the same anticlockwise direction to draw the two wires (66'). In response thereto, the slide ring (28") is slid backwardly along the female lock member (22), allowing the three divergent split sections (22aE) to be opened radially, with their elastic recovery nature, as in FIG. 3, for disengagement of the internally threaded regions (26) thereof from the externally threaded portion (20) of male lock rod member (14). All other operations should be done by the operation lever (36) in the same manner as described above in both first and second modes (10) (110) for locking and unlocking to attain a desired projection amount of the male lock rod member (14) from the female lock member (22). The present third mode (111) achieves the same effects with those of the second mode (110) that a uniform rectilinear drawing force can be applied to both slide ring (28") and compression spring (30), in addition to the same structure as in the first mode that the operation lever (36) is directly connected to the guide frame (44).

Of course, both second and third modes (110) (111) may be used in a reclining device as shown in FIG. 4, or used in other adjustment mechanisms in a vehicle seat.

Accordingly, in all the modes (10) (110) (111), the female lock member (22) provides an embracingly meshed engagement with and about the male lock rod member (14), which insures to lock the male lock rod member (14) at a selected point relative to the female lock member (22), with an unchanged locking quality, and further a user can move the operation lever (36) in a longitudinal direction with respect to the seat (see FIG. 4) and smoothly adjust a desired amount of projection of the male lock rod member (14).

While having described the present invention thus far, it should be understood that the invention is not limited to the illustrated embodiments, but other modifications, replacements and additions may be structurally and mechanically applied thereto without departing from the scopes of the appended claims. Naturally, it is free to adopt one of the first, second and third modes (10) (110) (111) or to only choose one of the three actuation means (D). Also, it is not limitative whether the operation lever (36) may be integral with the actuation means (D) or separate therefrom via a cable wire (66), and it is indeed possible to combine some parts of the three modes (10) (110) (111) together appropriately, depending on design requirements, within the gist of the present invention.

What is claimed is:

1. A longitudinal locking mechanism for a vehicle seat, comprising:

a tubular base member;

a male lock means having an external threaded portion, said male lock means being so slidably accommodated in said tubular base member as to project therefrom and withdraw thereinto in a longitudinal direction thereof;

a female lock means connected to said tubular base member, said female lock means having a bellmouthed split end portion in which a plurality of split sections are so defined as to be elastically warped outwardly and radially relative to a central axis of said female lock means, wherein inwardly threaded regions are defined in said plurality of split sections, respectively;

a slide means which is so slidably attached about said female lock means as to be movable along a longitudinal direction thereof for warping said plurality of split sections of said female lock means in a direction towards and away from a central axis of said female lock means;

an operation lever; and an actuation means operatively connected to said slide means and operation lever, said actuation means being operable via said operation lever to cause said slide means to be slid along said female lock means in the longitudinal direction thereof so as to forcibly warp said plurality of split sections of said female lock means inwardly towards said central axis of said female lock means to thereby bring said internally threaded regions of said plurality of split sections to a meshed engagement with a part of said externally threaded portion of said male lock means, so that said male lock means may be locked at a selected point relative to said female lock means and thus, a desired amount of projection of said male lock means may be adjusted from said tubular base member.

2. The longitudinal locking mechanism as defined in claim 1, wherein said male lock means is so biased by a biasing means as to project from said female lock means.

3. The longitudinal locking mechanism as defined in claim 1, wherein said actuation means includes a spring for so biasing said slide means as to forcibly warp said plurality of split sections of said female lock means inwardly towards said central axis of said female lock means.

4. The longitudinal locking mechanism as defined in claim 1, wherein said female lock means comprises a generally horn shape which is formed from a tubular metallic material such that said bellmouthed split end portion thereof is given a certain elastic property.

5. The longitudinal locking mechanism as defined in claim 1, wherein said male lock means comprises a male lock rod member with said externally threaded portion formed partway and circumferentially thereof, wherein said female lock means comprises a tubular female lock member with said bellmouthed split end portion and plurality of split sections formed therewith, and wherein said slide means comprises a slide ring slidably attached on and about said tubular female lock member.

6. The longitudinal locking mechanism as defined in claim 1, wherein said actuation means comprises: a compression spring interposed between said slide means and said tubular base member, said compression spring biasing said slide means such as to forcibly warp said plurality of split sections of said female lock means inwardly towards said central axis of said female lock means; and a drawing means for drawing said slide means against a biasing force of said compression spring in a direction away from said slide means, said drawing means being connected to said slide means and operation lever.

7. The longitudinal locking mechanism as defined in claim 6, wherein said compression spring is wound around a part of of said female lock means and retained between said slide means and tubular base member.

8. The longitudinal locking mechanism as defined in claim 6, wherein said drawing means comprises a guide frame rotatably provided at said tubular base member, with such an arrangement that said guide frame may be rotated relative to said tubular base member by said operation lever in a direction to draw said slide means away from said plurality of split sections of said female lock means, against the biasing force of said compression spring.

9. The longitudinal locking mechanism as defined in claim 8, wherein said guide frame is formed in a manner surrounding both said female lock means and tubular lock member and having a center of rotation above said tubular lock member, wherein further said guide frame has a pair of holes formed in respective two lateral sides thereof such as to be disposed symmetrically to and on opposite sides of both said female lock means and tubular base member, wherein said slide means is provided with a pair of spaced-apart engagement pins projecting in a direction opposite to each other, said pair of spaced-apart engagement pins being fitted in said pair of holes of said guide frame, respectively, and wherein rotation of said operation lever against the biasing force of said compression spring causes simultaneous rotation of said guide frame relative to said rotation of center, thereby drawing said slide frame in a direction away from said plurality of split sections of said female lock means.

10. The longitudinal locking mechanism as defined in claim 8, wherein said guide frame is of a generally rectangular shape, and wherein an upper side of said guide frame is connected rotatably to a part of a bracket fixed on the upper side of said tubular base member, said part of bracket corresponding to said center of rotation, wherein said pair of holes are formed in respective two lateral sides of said guide frame, and wherein said operation lever is fixed to one of said two lateral sides of said guide frame.

11. The longitudinal locking mechanism as defined in claim 8, wherein said guide frame is provided separately from said tubular base member, having a center of rotation defined therein, wherein said drawing means further includes a pair of cable wires disposed symmetrically relative to and alongside both said female lock means and tubular base member, with such an arrangement that first end portions respectively of said pair of spaced-apart cable wires are fixed to two lateral sides of said slide means and slidably supported on said tubular member, and second end portions respectively of said pair of spaced-apart cable wires are both connected to said guide frame, and wherein rotation of said operation lever against the biasing force of said compression spring causes simultaneous rotation of said guide frame relative to said rotation of center, thereby drawing said slide frame via said pair of spaced-apart cable wires in a direction away from said plurality of split sections of said female lock means.

12. The longitudinal locking mechanism as defined in claim 8, wherein said guide frame is formed in a generally U-shaped manner around said tubular lock member, having a center of rotation above said tubular lock member thereof and said drawing means further includes a pair of wires disposed symmetrically relative to and alongside both said female lock means and tubular base member, with such an arrangement that first end portions respectively of said pair of spaced-apart wires are fixed to two lateral sides of said slide means, and second end portions respectively of said pair of spaced-apart wires are fixed to two lateral sides of said guide frame, and wherein rotation of said operation lever against the biasing force of said compression spring causes simultaneous rotation of said guide frame relative to said rotation of center, thereby drawing said slide frame via said pair of spaced-apart wires in a direction away from said plurality of split sections of said female lock means.

13. The longitudinal locking mechanism as defined in claim 12, wherein one of said two lateral sides of said guide frame extends upwardly longer than another of them and terminates in a hook-like end portion, wherein said center of rotation is defined at said hook-like end portion of said guide frame, and wherein said operation lever is connected to said hook-like end portion of said guide frame.

14. The longitudinal locking mechanism as defined in claim 6, wherein said compression spring is retained between a pair of flange means, each being provided at said slide means and tubular base member.

15. The longitudinal locking mechanism as defined in claim 1, which is arranged such that said operation lever is movable in a generally longitudinal direction with respect to the vehicle seat so as to cause said slide means, via said actuation means, to be slid along said female lock means, thereby effecting meshed engagement between said externally threaded portion of said male lock means and said internally threaded regions of said female lock means.

16. The longitudinal locking mechanism as defined in claim 1, wherein said slide means is formed with a divergently sloped internal annular area in one end portion thereof such as to closely contact a divergent root area of said bellmouthed split end portion of said female lock means.

* * * * *